(12) United States Patent
Elmfors

(10) Patent No.: US 12,207,016 B2
(45) Date of Patent: Jan. 21, 2025

(54) TEMPERATURE COMPENSATION IN INFRARED IMAGING SYSTEMS AND METHODS

(71) Applicant: Teledyne FLIR Commercial Systems, Inc., Goleta, CA (US)

(72) Inventor: Per O. Elmfors, Goleta, CA (US)

(73) Assignee: Teledyne FLIR Commercial Systems, Inc., Goleta, CA (US)

( * ) Notice: Subject to any disclaimer, the term of this patent is extended or adjusted under 35 U.S.C. 154(b) by 148 days.

(21) Appl. No.: 17/744,497

(22) Filed: May 13, 2022

(65) Prior Publication Data

US 2023/0048503 A1    Feb. 16, 2023

Related U.S. Application Data

(60) Provisional application No. 63/194,150, filed on May 27, 2021.

(51) Int. Cl.
| | | |
|---|---|---|
| H04N 5/33 | (2023.01) | |
| G01J 5/20 | (2006.01) | |
| G01J 5/24 | (2006.01) | |
| G01J 5/70 | (2022.01) | |

(52) U.S. Cl.
CPC ............ H04N 5/33 (2013.01); G01J 5/24 (2013.01); G01J 5/70 (2022.01); *G01J 2005/202* (2013.01)

(58) Field of Classification Search
CPC ... H04N 5/33; H04N 25/67; G01J 5/24; G01J 5/70; G01J 2005/202; G01J 5/064; G01J 5/16; G01J 5/48
See application file for complete search history.

(56) References Cited

U.S. PATENT DOCUMENTS 9,797,619 B2    10/2017  Aljabari et al.
2020/0154063 A1*  5/2020  Kostrzewa ............... H04N 5/33

FOREIGN PATENT DOCUMENTS

EP         3 985 367        4/2022
WO    WO 2020/250327     12/2020

\* cited by examiner

*Primary Examiner* — David P Porta
*Assistant Examiner* — Meenakshi S Sahu
(74) *Attorney, Agent, or Firm* — Haynes and Boone, LLP

(57) ABSTRACT

Techniques for facilitating temperature compensation are provided. In one example, an infrared imaging system includes a focal plane array configured to capture radiation from a scene and generate image data based on the radiation. The focal plane array further captures radiation from an element associated with the infrared imaging system during capture of the radiation from the scene. The infrared imaging system further includes a temperature sensor configured to determine a temperature of the focal plane array. The infrared imaging system further includes a processing circuit configured to determine a temperature associated with the element based on the temperature of the focal plane array. The processing circuit is further configured to determine a temperature associated with an object in the scene based on the infrared image data, the temperature associated with the element, and the temperature of the focal plane array. Related devices and methods are also provided.

20 Claims, 3 Drawing Sheets

TEMPERATURE COMPENSATION IN INFRARED IMAGING SYSTEMS AND METHODS

CROSS REFERENCE TO RELATED APPLICATIONS

This application claims priority to and the benefit of U.S. Provisional Patent Application No. 63/194,150 filed May 27, 2021 and entitled "Temperature Compensation In Infrared Imaging Systems And Methods," which is hereby incorporated by reference in its entirety.

TECHNICAL FIELD

One or more embodiments relate generally to imaging and more particularly, for example, to temperature compensation in infrared imaging systems and methods.

BACKGROUND

Imaging systems may include an array of detectors, with each detector functioning as a pixel to produce a portion of a two-dimensional image. There are a wide variety of image detectors, such as visible-light image detectors, infrared image detectors, or other types of image detectors that may be provided in an image detector array for capturing an image. As an example, a plurality of sensors may be provided in an image detector array to detect electromagnetic (EM) radiation at desired wavelengths. In some cases, such as for infrared imaging, readout of image data captured by the detectors may be performed in a time-multiplexed manner by a readout integrated circuit (ROIC). The image data that is read out may be communicated to other circuitry, such as for processing, storage, and/or display. In some cases, a combination of a detector array and an ROIC may be referred to as a focal plane array (FPA). Advances in process technology for FPAs and image processing have led to increased capabilities and sophistication of resulting imaging systems.

SUMMARY

In one or more embodiments, an infrared imaging system includes an FPA configured to capture radiation from a scene and generate infrared image data based on the radiation. The FPA further captures radiation from an element associated with the infrared imaging system during capture of the radiation from the scene. The infrared imaging system further includes a temperature sensor configured to determine a temperature of the FPA. The infrared imaging system further includes a processing circuit configured to determine a temperature associated with the element based at least in part on the temperature of the FPA. The processing circuit is further configured to determine a temperature associated with an object in the scene based on the infrared image data, the temperature associated with the element, and the temperature of the FPA.

In one or more embodiments, a method includes capturing, by an FPA, radiation from an element and from a scene. The method further includes generating, by the FPA, infrared image data based on the radiation. The method further includes determining a temperature of the FPA. The method further includes determining a temperature associated with the element based at least in part on the temperature of the FPA. The method further includes determining a temperature associated with an object in the scene based on the infrared image data, the temperature associated with the element, and the temperature of the FPA.

The scope of the present disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

Figure 1:
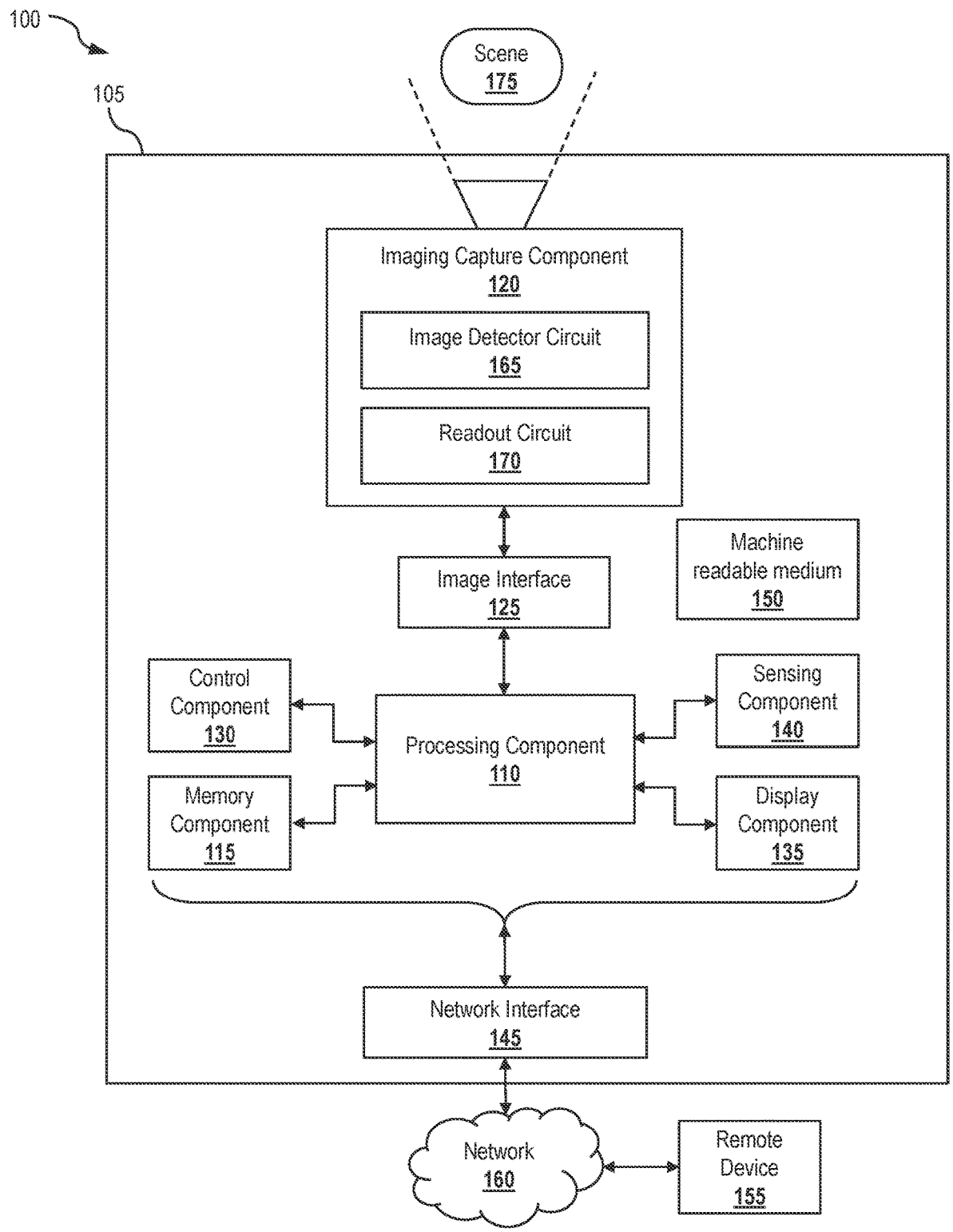
FIG. 1 illustrates a block diagram of an example imaging system in accordance with one or more embodiments of the present disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Various techniques are provided to facilitate temperature compensation in infrared imaging systems and methods. An infrared imaging system (e.g., a thermal camera) may be used to capture infrared image data associated with a scene using an image sensor device (e.g., a detector array of an FPA). The image sensor device includes detectors (e.g., also referred to as detector pixels, detector elements, or simply pixels). Each detector pixel may detect incident EM radiation and generate infrared image data indicative of the detected EM radiation of the scene. In some embodiments, the image sensor array is used to detect infrared radiation (e.g., thermal infrared radiation). For pixels of an infrared image (e.g., thermal infrared image), each output value of a pixel may be represented/provided as and/or correspond to a temperature, digital count value, percentage of a full temperature range, or generally any value that can be mapped to the temperature. For example, a digital count value of 13,000 output by a pixel may represent a temperature of 160° C. As such, the captured infrared image data may indicate or may be used to determine a temperature of objects, persons, and/or other features/aspects in the scene.

In some cases, the infrared imaging system may represent the infrared image data in an image according to a palette. The palette may provide a mapping from distinct output levels to visual representation values. The palette may be applied to image data values output by the image sensor device (e.g., based on detected EM radiation) of the infrared imaging system to generate the image. In this regard, an image may be considered a visual representation of the image data values. Visual representation values of a palette may include color values and/or grayscale values. In some cases, the visual representation values may facilitate analysis of the scene by a user(s) of the infrared imaging system and/or by circuitry (e.g., machine vision) of the infrared imaging system and/or other machine(s).

A spatial gradient in the infrared imaging system may be determined (e.g., estimated) by measuring temporal gradients (e.g., rate of change of temperature). The infrared imaging system that is heated up from the outside (e.g., when the infrared imaging system is taken from cold air outside to room temperature air inside) may exhibit a spatial thermal gradient that is correlated (e.g., strongly correlated) to a rate of change of temperature. In this case, a change in ambient temperature may change a temperature of the image sensor device of the infrared imaging system relative to a temperature of another component, such as the housing, of the infrared imaging system.

During a startup of (e.g., an initial power on of) the infrared imaging system or other internal heating process, the infrared imaging system is heated up internally. The spatial thermal gradients may then be different for the same measured rate of change. As one example, the startup may end after around five minutes (e.g., steady state begins after around five minutes after startup is initiated). After the startup ends, temperatures and rates of change of temperature associated with various components of the infrared imaging system may generally be caused by external factors rather than internal heating of the infrared imaging system. As an example of an internal heating process other than startup, an internal heating process may result from a change in operating mode of the infrared imaging system, such as a changing of a frame rate associated with an FPA which may cause a change in internal heating. As another example, an internal heating process may result from turning on/off or otherwise changing power dissipating electronics (e.g., those close to the FPA). For example, an internal heating process may result from changing image processing on a processor that is thermally coupled (e.g., closely thermally coupled) to the FPA.

In some embodiments, the infrared imaging system may perform temperature compensation to provide temperature measurements of higher accuracy (e.g., higher radiometric accuracy) relative to a case in which compensation is not performed, even during a startup mode in which the infrared imaging system exhibits significant internal heating (e.g., due to powering on of various components of the infrared imaging system). In this regard, the compensation may adapt between compensation while the infrared imaging system exhibits startup behavior in which internal heating is significant and compensation while the infrared imaging system exhibits steady state behavior in which temperature changes are primarily caused by external factors. In an aspect, the infrared imaging system may be referred to as operating in a startup mode/condition (e.g., also referred to as a transient mode/condition) and a steady state mode/condition (e.g., also referred to as an equilibrium mode/condition). An amount of time that the infrared imaging system spends operating in the startup mode and the steady state mode may be based in part on an ambient temperature. For example, the infrared imaging system may operate longer in the startup mode if it is turned on in a cold ambient temperature relative to being turned on in a warmer ambient temperature. In some cases, the compensation may allow gradients caused by external temperature changes to be accounted differently from internal temperature variations expected at startup.

The compensation may account for internal radiation on the image sensor device of the infrared imaging system. Such internal radiation may be considered and referred to as non-scene-related radiation/undesired radiation that is generated by internal components of the infrared imaging system and captured by the image sensor device during operation of the image sensor device to capture scene information. Such internal radiation radiated onto the image sensor device may affect image data of the scene as captured by the image sensor device and thus affect temperatures related to the scene (e.g., of objects and/or other features/aspects of the scene) determined by the infrared imaging system. As one example, the infrared imaging system may need to compensate for out-of-field radiation to provide accurate radiometric information.

In this regard, the infrared imaging system may perform temperature compensation to account for radiation from one or more components (e.g., internal components) of the infrared imaging system that may be received by the image sensor device. By way of non-limiting examples, a component that may radiate onto the image sensor array may include a housing of the infrared imaging system, optics (e.g., lenses, mirrors, etc.) of the infrared imaging system, and/or a shutter of the infrared imaging system. The compensation may be based on temperature data from one or more temperature sensors (e.g., also referred to as thermal sensors), such as thermistors and/or thermocouples. In some cases, each temperature sensor is within a housing the infrared imaging system. Each temperature sensor may be used to measure a temperature of a component of the infrared imaging system that may radiate onto the image sensor array. A thermal gradient (e.g., a rate of change of the temperature) associated with the component may be determined based on measurements, at different points in time, of the temperature of the component by the temperature sensor.

For other components that may radiate onto the image sensor array, a temperature of these other components may be determined (e.g., modeled and estimated) based on the temperature data from the temperature sensor(s). In an aspect, the temperature of these component may be determined using models (e.g., thermal models), as further described herein. In some cases, such models may account for thermal gradients generated by varying external temperatures. Temperature data (e.g., temperature measurements) from one or more thermal sensors may be used as input to the models. These models may account for/differentiate between operation in the startup mode and in the steady state mode.

As one example, the infrared imaging system may be a small camera module that includes a single temperature sensor used to measure a temperature of an FPA. A temperature of one or more other components (e.g., housing, shutter, and/or lens) of the infrared imaging system may be determined based at least on temperature measurements of the FPA by the single temperature sensor. As another example, the infrared imaging system may include a temperature sensor to measure the temperature of the FPA and a temperature sensor to measure the temperature of the lens. A temperature of other components (e.g., housing and/or shutter) may be determined based at least on temperature measurements of the FPA and the lens. In some cases, a temperature sensor(s) may not be disposed on each component itself due to spatial considerations (e.g., limited space around the component and/or within the housing, disposing of a temperature sensor on the component may block an optical path to the FPA, etc.), manufacturing and/or component costs, power considerations (e.g., each disposed temperature sensor requires power to operate), and/or other considerations.

As such, using various embodiments, external temperature variations may be compensated/accounted for through measurements and modeling of internal temperatures of the infrared imaging system. In some aspects, the compensation may be performed without using/disposing temperature sensors outside of the infrared imaging system (e.g., without using ambient temperature sensors).

Although various embodiments for temperature compensation are described primarily with respect to infrared imaging, temperature compensation using methods and systems disclosed herein may be utilized in conjunction with devices and systems such as infrared imaging systems, imaging systems having visible-light and infrared imaging capability, short-wave infrared (SWIR) imaging systems, light detection and ranging (LIDAR) imaging systems, radar detection and ranging (RADAR) imaging systems, millimeter wavelength (MMW) imaging systems, ultrasonic imaging systems, X-ray imaging systems, microscope systems, mobile digital cameras, video surveillance systems, video processing systems, or other systems or devices that may need to obtain image data in one or multiple portions of the EM spectrum. For example, temperature compensated images may be infrared images of a scene that can be fused/blended with visible-light images of the scene.

Referring now to the drawings, FIG. 1 illustrates a block diagram of an example imaging system 100 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The imaging system 100 may be utilized for capturing and processing images in accordance with an embodiment of the disclosure. The imaging system 100 may represent any type of imaging system that detects one or more ranges (e.g., wavebands) of EM radiation and provides representative data (e.g., one or more still image frames or video image frames). The imaging system 100 may include an imaging device 105. By way of non-limiting examples, the imaging device 105 may be, may include, or may be a part of an infrared camera, a visible-light camera, a tablet computer, a laptop, a personal digital assistant (PDA), a mobile device, a desktop computer, or other electronic device. The imaging device 105 may include a housing that at least partially encloses components of the imaging device 105, such as to facilitate compactness and protection of the imaging device 105. For example, the solid box labeled 105 in FIG. 1 may represent a housing of the imaging device 105. The housing may contain more, fewer, and/or different components of the imaging device 105 than those depicted within the solid box in FIG. 1. In an embodiment, the imaging system 100 may include a portable device and may be incorporated, for example, into a vehicle or a non-mobile installation requiring images to be stored and/or displayed. The vehicle may be a land-based vehicle (e.g., automobile, truck), a naval-based vehicle, an aerial vehicle (e.g., unmanned aerial vehicle (UAV)), a space vehicle, or generally any type of vehicle that may incorporate (e.g., installed within, mounted thereon, etc.) the imaging system 100. In another example, the imaging system 100 may be coupled to various types of fixed locations (e.g., a home security mount, a campsite or outdoors mount, or other location) via one or more types of mounts.

The imaging system 105 includes, according to one implementation, a processing component 110, a memory component 115, an image capture component 120, an image interface 125, a control component 130, a display component 135, a sensing component 140, and/or a network interface 145. The processing component 110, according to various embodiments, includes one or more of a processor, a microprocessor, a central processing unit (CPU), a graphics processing unit (GPU), a single-core processor, a multi-core processor, a microcontroller, a programmable logic device (PLD) (e.g., field programmable gate array (FPGA)), an application specific integrated circuit (ASIC), a digital signal processing (DSP) device, or other logic device that may be configured, by hardwiring, executing software instructions, or a combination of both, to perform various operations discussed herein for embodiments of the disclosure. The processing component 110 may be configured to interface and communicate with the various other components (e.g., 115, 120, 125, 130, 135, 140, 145, etc.) of the imaging system 100 to perform such operations. For example, the processing component 110 may be configured to process captured image data received from the imaging capture component 120, store the image data in the memory component 115, and/or retrieve stored image data from the memory component 115. In one aspect, the processing component 110 may be configured to perform various system control operations (e.g., to control communications and operations of various components of the imaging system 100) and other image processing operations (e.g., data conversion, data transformation, data compression, video analytics, etc.).

The memory component 115 includes, in one embodiment, one or more memory devices configured to store data and information, including infrared image data and information. The memory component 115 may include one or more various types of memory devices including volatile and non-volatile memory devices, such as random access memory (RAM), dynamic RAM (DRAM), static RAM (SRAM), non-volatile random-access memory (NVRAM), read-only memory (ROM), programmable read-only memory (PROM), erasable programmable read-only memory (EPROM), electrically-erasable programmable read-only memory (EEPROM), flash memory, hard disk drive, and/or other types of memory. As discussed above, the processing component 110 may be configured to execute software instructions stored in the memory component 115 so as to perform method and process steps and/or operations. The processing component 110 and/or the image interface 125 may be configured to store in the memory component 115 images or digital image data captured by the image capture component 120.

In some embodiments, a separate machine-readable medium 150 (e.g., a memory, such as a hard drive, a compact disk, a digital video disk, or a flash memory) may store the software instructions and/or configuration data which can be executed or accessed by a computer (e.g., a logic device or processor-based system) to perform various methods and operations, such as methods and operations associated with processing image data. In one aspect, the machine-readable medium 150 may be portable and/or located separate from the imaging device 105, with the stored software instructions and/or data provided to the imaging device 105 by coupling the machine-readable medium 150 to the imaging device 105 and/or by the imaging device 105 downloading (e.g., via a wired link and/or a wireless link) from the machine-readable medium 150. It should be appreciated that various modules may be integrated in software and/or hardware as part of the processing component 110, with code (e.g., software or configuration data) for the modules stored, for example, in the memory component 115.

The imaging device 105 may be a video and/or still camera to capture and process images and/or videos of a scene 175. In this regard, the image capture component 120 of the imaging device 105 may be configured to capture images (e.g., still and/or video images) of the scene 175 in a particular spectrum or modality. The image capture component 120 includes an image detector circuit 165 (e.g., a visible-light detector circuit, a thermal infrared detector circuit) and a readout circuit 170 (e.g., an ROIC). For example, the image capture component 120 may include an IR imaging sensor (e.g., IR imaging sensor array) configured to detect IR radiation in the near, middle, and/or far IR spectrum and provide IR images (e.g., IR image data or signal) representative of the IR radiation from the scene 175. For example, the image detector circuit 165 may capture (e.g., detect, sense) IR radiation with wavelengths in the range from around 700 nm to around 2 mm, or portion thereof. For example, in some aspects, the image detector circuit 165 may be sensitive to (e.g., better detect) SWIR radiation, mid-wave IR (MWIR) radiation (e.g., EM radiation with wavelength of 2 µm to 5 µm), and/or long-wave IR (LWIR) radiation (e.g., EM radiation with wavelength of 7 µm to 14 µm), or any desired IR wavelengths (e.g., generally in the 0.7 µm to 14 µm range). In other aspects, the image detector circuit 165 may capture radiation from one or more other wavebands of the EM spectrum, such as visible light, ultraviolet light, and so forth.

The image detector circuit 165 may capture image data (e.g., infrared image data) associated with the scene 175. To capture a detector output image, the image detector circuit 165 may detect image data of the scene 175 (e.g., in the form of EM radiation) and generate pixel values of the image based on the scene 175. An image may be referred to as a frame or an image frame. In some cases, the image detector circuit 165 may include an array of detectors (e.g., also referred to as an array of pixels) that can detect radiation of a certain waveband, convert the detected radiation into electrical signals (e.g., voltages, currents, etc.), and generate the pixel values based on the electrical signals. Each detector in the array may capture a respective portion of the image data and generate a pixel value based on the respective portion captured by the detector. The pixel value generated by the detector may be referred to as an output of the detector. By way of non-limiting examples, each detector may be a photodetector, such as an avalanche photodiode, an infrared photodetector, a quantum well infrared photodetector, a microbolometer, or other detector capable of converting EM radiation (e.g., of a certain wavelength) to a pixel value. The array of detectors may be arranged in rows and columns.

The detector output image may be, or may be considered, a data structure that includes pixels and is a representation of the image data associated with the scene 175, with each pixel having a pixel value that represents EM radiation emitted or reflected from a portion of the scene 175 and received by a detector that generates the pixel value. Based on context, a pixel may refer to a detector of the image detector circuit 165 that generates an associated pixel value or a pixel (e.g., pixel location, pixel coordinate) of the detector output image formed from the generated pixel values. In one example, the detector output image may be an infrared image (e.g., thermal infrared image). For a thermal infrared image (e.g., also referred to as a thermal image), each pixel value of the thermal infrared image may represent a temperature of a corresponding portion of the scene 175. In another example, the detector output image may be a visible-light image.

In an aspect, the pixel values generated by the image detector circuit 165 may be represented in terms of digital count values generated based on the electrical signals obtained from converting the detected radiation. For example, in a case that the image detector circuit 165 includes or is otherwise coupled to an analog-to-digital (ADC) circuit, the ADC circuit may generate digital count values based on the electrical signals. For an ADC circuit that can represent an electrical signal using 14 bits, the digital count value may range from 0 to 16,383. In such cases, the pixel value of the detector may be the digital count value output from the ADC circuit. In other cases (e.g., in cases without an ADC circuit), the pixel value may be analog in nature with a value that is, or is indicative of, the value of the electrical signal. As an example, for infrared imaging, a larger amount of IR radiation being incident on and detected by the image detector circuit 165 (e.g., an IR image detector circuit) is associated with higher digital count values and higher temperatures.

The readout circuit 170 may be utilized as an interface between the image detector circuit 165 that detects the image data and the processing component 110 that processes the detected image data as read out by the readout circuit 170, with communication of data from the readout circuit 170 to the processing component 110 facilitated by the image interface 125. An image capturing frame rate may refer to the rate (e.g., detector output images per second) at which images are detected/output in a sequence by the image detector circuit 165 and provided to the processing component 110 by the readout circuit 170. The readout circuit 170 may read out the pixel values generated by the image detector circuit 165 in accordance with an integration time (e.g., also referred to as an integration period).

In various embodiments, a combination of the image detector circuit 165 and the readout circuit 170 may be, may include, or may together provide an FPA. In some aspects, the image detector circuit 165 may be a thermal image detector circuit that includes an array of microbolometers, and the combination of the image detector circuit 165 and the readout circuit 170 may be referred to as a microbolometer FPA. In some cases, the array of microbolometers may be arranged in rows and columns. The microbolometers may detect IR radiation and generate pixel values based on the detected IR radiation. For example, in some cases, the microbolometers may be thermal IR detectors that detect IR radiation in the form of heat energy and generate pixel values based on the amount of heat energy detected. The microbolometers may absorb incident IR radiation and produce a corresponding change in temperature in the microbolometers. The change in temperature is associated with a corresponding change in resistance of the microbolometers. With each microbolometer functioning as a pixel, a two-dimensional image or picture representation of the incident IR radiation can be generated by translating the changes in resistance of each microbolometer into a time-multiplexed electrical signal. The translation may be performed by the ROIC. The microbolometer FPA may include IR detecting materials such as amorphous silicon (a-Si), vanadium oxide ($VO_x$), a combination thereof, and/or other detecting material(s). In an aspect, for a microbolometer FPA, the integration time may be, or may be indicative of, a time interval during which the microbolometers are biased. In this case, a longer integration time may be associated with higher gain of the IR signal, but not more IR radiation being collected. The IR radiation may be collected in the form of heat energy by the microbolometers.

In some cases, the image capture component 120 may include one or more filters adapted to pass radiation of some wavelengths but substantially block radiation of other wavelengths. For example, the image capture component 120 may be an IR imaging device that includes one or more filters adapted to pass IR radiation of some wavelengths while substantially blocking IR radiation of other wavelengths (e.g., MWIR filters, thermal IR filters, and narrow-band filters). In this example, such filters may be utilized to tailor the image capture component 120 for increased sensitivity to a desired band of IR wavelengths. In an aspect, an IR imaging device may be referred to as a thermal imaging device when the IR imaging device is tailored for capturing thermal IR images. Other imaging devices, including IR imaging devices tailored for capturing infrared IR images outside the thermal range, may be referred to as non-thermal imaging devices.

In one specific, not-limiting example, the image capture component 120 may include an IR imaging sensor having an FPA of detectors responsive to IR radiation including near infrared (NIR), SWIR, MWIR, LWIR, and/or very-long wave IR (VLWIR) radiation. In some other embodiments, alternatively or in addition, the image capture component 120 may include a complementary metal oxide semiconductor (CMOS) sensor or a charge-coupled device (CCD) sensor that can be found in any consumer camera (e.g., visible light camera).

Other imaging sensors that may be embodied in the image capture component 120 include a photonic mixer device (PMD) imaging sensor or other time of flight (ToF) imaging sensor, LIDAR imaging device, RADAR imaging device, millimeter imaging device, positron emission tomography (PET) scanner, single photon emission computed tomography (SPECT) scanner, ultrasonic imaging device, or other imaging devices operating in particular modalities and/or spectra. It is noted that for some of these imaging sensors that are configured to capture images in particular modalities and/or spectra (e.g., infrared spectrum, etc.), they are more prone to produce images with low frequency shading, for example, when compared with a typical CMOS-based or CCD-based imaging sensors or other imaging sensors, imaging scanners, or imaging devices of different modalities.

The images, or the digital image data corresponding to the images, provided by the image capture component 120 may be associated with respective image dimensions (also referred to as pixel dimensions). An image dimension, or pixel dimension, generally refers to the number of pixels in an image, which may be expressed, for example, in width multiplied by height for two-dimensional images or otherwise appropriate for relevant dimension or shape of the image. Thus, images having a native resolution may be resized to a smaller size (e.g., having smaller pixel dimensions) in order to, for example, reduce the cost of processing and analyzing the images. Filters (e.g., a non-uniformity estimate) may be generated based on an analysis of the resized images. The filters may then be resized to the native resolution and dimensions of the images, before being applied to the images.

The image interface 125 may include, in some embodiments, appropriate input ports, connectors, switches, and/or circuitry configured to interface with external devices (e.g., a remote device 155 and/or other devices) to receive images (e.g., digital image data) generated by or otherwise stored at the external devices. In an aspect, the image interface 125 may include a serial interface and telemetry line for providing metadata associated with image data. The received images or image data may be provided to the processing component 110. In this regard, the received images or image data may be converted into signals or data suitable for processing by the processing component 110. For example, in one embodiment, the image interface 125 may be configured to receive analog video data and convert it into suitable digital data to be provided to the processing component 110.

The image interface 125 may include various standard video ports, which may be connected to a video player, a video camera, or other devices capable of generating standard video signals, and may convert the received video signals into digital video/image data suitable for processing by the processing component 110. In some embodiments, the image interface 125 may also be configured to interface with and receive images (e.g., image data) from the image capture component 120. In other embodiments, the image capture component 120 may interface directly with the processing component 110.

The control component 130 includes, in one embodiment, a user input and/or an interface device, such as a rotatable knob (e.g., potentiometer), push buttons, slide bar, keyboard, and/or other devices, that is adapted to generate a user input control signal. The processing component 110 may be configured to sense control input signals from a user via the control component 130 and respond to any sensed control input signals received therefrom. The processing component 110 may be configured to interpret such a control input signal as a value, as generally understood by one skilled in the art. In one embodiment, the control component 130 may include a control unit (e.g., a wired or wireless handheld control unit) having push buttons adapted to interface with a user and receive user input control values. In one implementation, the push buttons of the control unit may be used to control various functions of the imaging device 105, such as autofocus, menu enable and selection, field of view, brightness, contrast, noise filtering, image enhancement, and/or various other features.

The display component 135 includes, in one embodiment, an image display device (e.g., a liquid crystal display (LCD)) or various other types of generally known video displays or monitors. The processing component 110 may be configured to display image data and information on the display component 135. The processing component 110 may be configured to retrieve image data and information from the memory component 115 and display any retrieved image data and information on the display component 135. The display component 135 may include display circuitry, which may be utilized by the processing component 110 to display image data and information. The display component 135 may be adapted to receive image data and information directly from the image capture component 120, processing component 110, and/or image interface 125, or the image data and information may be transferred from the memory component 115 via the processing component 110. In some aspects, the control component 130 may be implemented as part of the display component 135. For example, a touchscreen of the imaging device 105 may provide both the control component 130 (e.g., for receiving user input via taps and/or other gestures) and the display component 135 of the imaging device 105.

The sensing component 140 includes, in one embodiment, one or more sensors of various types, depending on the application or implementation requirements, as would be understood by one skilled in the art. Sensors of the sensing component 140 provide data and/or information to at least the processing component 110. In one aspect, the processing component 110 may be configured to communicate with the sensing component 140. In various implementations, the sensing component 140 may provide information regarding environmental conditions, such as outside temperature, lighting conditions (e.g., day, night, dusk, and/or dawn), humidity level, specific weather conditions (e.g., sun, rain, and/or snow), distance (e.g., laser rangefinder or time-of-flight camera), and/or whether a tunnel or other type of enclosure has been entered or exited. The sensing component 140 may represent conventional sensors as generally known by one skilled in the art for monitoring various conditions (e.g., environmental conditions) that may have an effect (e.g., on the image appearance) on the image data provided by the image capture component 120.

In some implementations, the sensing component 140 (e.g., one or more sensors) may include devices that relay information to the processing component 110 via wired and/or wireless communication. For example, the sensing component 140 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques. In some embodiments, the processing component 110 can use the information (e.g., sensing data) retrieved from the sensing component 140 to modify a configuration of the image capture component 120 (e.g., adjusting a light sensitivity level, adjusting a direction or angle of the image capture component 120, adjusting an aperture, etc.).

In some embodiments, the sensing component 140 may include a temperature sensing component to provide temperature data (e.g., one or more measured temperature values) associated with the scene 175. The temperature sensing component may include one or more temperature sensors. In some cases, a temperature sensor may be a non-contact temperature sensor or a contact temperature sensor. By way of non-limiting examples, a temperature sensor may include a thermistor, thermocouple, thermopile, pyrometer, and/or other appropriate sensor for providing temperature data. In some cases, temperature data captured by the temperature sensing component may be provided to the processing component 110 through a temperature data interface. The temperature data interface may receive the temperature data and convert the temperature data to a format appropriate for the processing component 110.

In some embodiments, various components of the imaging system 100 may be distributed and in communication with one another over a network 160. In this regard, the imaging device 105 may include a network interface 145 configured to facilitate wired and/or wireless communication among various components of the imaging system 100 over the network 160. In such embodiments, components may also be replicated if desired for particular applications of the imaging system 100. That is, components configured for same or similar operations may be distributed over a network. Further, all or part of any one of the various components may be implemented using appropriate components of the remote device 155 (e.g., a conventional digital video recorder (DVR), a computer configured for image processing, and/or other device) in communication with various components of the imaging system 100 via the network interface 145 over the network 160, if desired. Thus, for example, all or part of the processing component 110, all or part of the memory component 115, and/or all of part of the display component 135 may be implemented or replicated at the remote device 155. In some embodiments, the imaging system 100 may not include imaging sensors (e.g., image capture component 120), but instead receive images or image data from imaging sensors located separately and remotely from the processing component 110 and/or other components of the imaging system 100. It will be appreciated that many other combinations of distributed implementations of the imaging system 100 are possible, without departing from the scope and spirit of the disclosure.

Furthermore, in various embodiments, various components of the imaging system 100 may be combined and/or implemented or not, as desired or depending on the application or requirements. In one example, the processing component 110 may be combined with the memory component 115, image capture component 120, image interface 125, display component 135, sensing component 140, and/or network interface 145. In another example, the processing component 110 may be combined with the image capture component 120, such that certain functions of processing component 110 are performed by circuitry (e.g., a processor, a microprocessor, a logic device, a microcontroller, etc.) within the image capture component 120.

Figure 2:
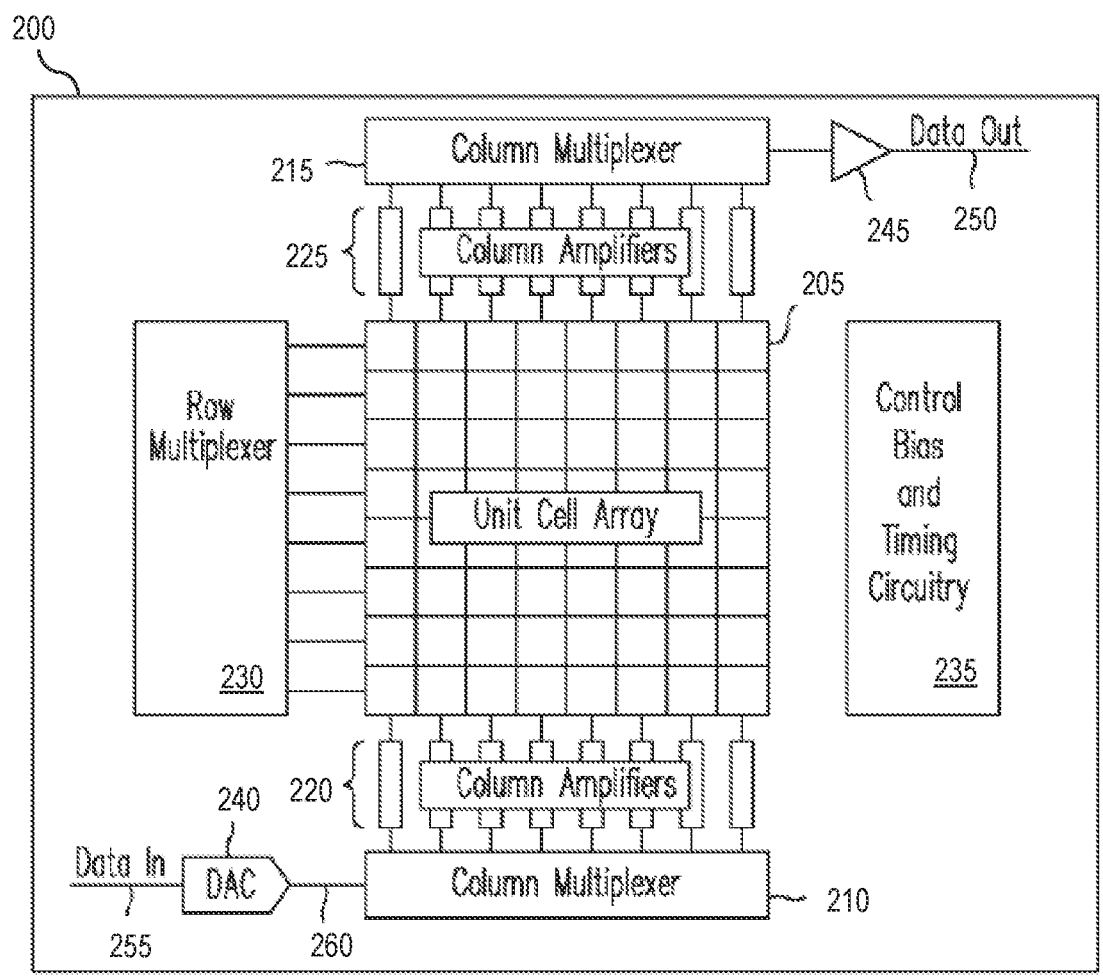
FIG. 2 illustrates a block diagram of an example image sensor assembly in accordance with one or more embodiments of the present disclosure.

FIG. 2 illustrates a block diagram of an example image sensor assembly 200 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the image sensor assembly 200 may be an FPA, for example, implemented as the image capture component 120 of FIG. 1.

The image sensor assembly 200 includes a unit cell array 205, column multiplexers 210 and 215, column amplifiers 220 and 225, a row multiplexer 230, control bias and timing circuitry 235, a digital-to-analog converter (DAC) 240, and a data output buffer 245. In some aspects, operations of and/or pertaining to the unit cell array 205 and other components may be performed according to a system clock and/or synchronization signals (e.g., line synchronization (LSYNC) signals). The unit cell array 205 includes an array of unit cells. In an aspect, each unit cell may include a detector (e.g., a pixel) and interface circuitry. The interface circuitry of each unit cell may provide an output signal, such as an output voltage or an output current, in response to a detection signal (e.g., detection current, detection voltage) provided by the detector of the unit cell. The output signal may be indicative of the magnitude of EM radiation received by the detector and may be referred to as image pixel data or simply image data. The column multiplexer 215, column amplifiers 220, row multiplexer 230, and data output buffer 245 may be used to provide the output signals from the unit cell array 205 as a data output signal on a data output line 250. The output signals on the data output line 250 may be provided to components downstream of the image sensor assembly 200, such as processing circuitry (e.g., the processing component 110 of FIG. 1), memory (e.g., the memory component 115 of FIG. 1), display device (e.g., the display component 135 of FIG. 1), and/or other component to facilitate processing, storage, and/or display of the output signals. The data output signal may be an image formed of the pixel values for the image sensor assembly 200. In this regard, the column multiplexer 215, the column amplifiers 220, the row multiplexer 230, and the data output buffer 245 may collectively provide an ROIC (or portion thereof) of the image sensor assembly 200. In an aspect, the interface circuitry may be considered part of the ROIC, or may be considered an interface between the detectors and the ROIC. In some embodiments, components of the image sensor assembly 200 may be implemented such that the unit cell array 205 and the ROIC may be part of a single die.

The column amplifiers 225 may generally represent any column processing circuitry as appropriate for a given application (analog and/or digital), and is not limited to amplifier circuitry for analog signals. In this regard, the column amplifiers 225 may more generally be referred to as column processors in such an aspect. Signals received by the column amplifiers 225, such as analog signals on an analog bus and/or digital signals on a digital bus, may be processed according to the analog or digital nature of the signal. As an example, the column amplifiers 225 may include circuitry for processing digital signals. As another example, the column amplifiers 225 may be a path (e.g., no processing) through which digital signals from the unit cell array 205 traverses to get to the column multiplexer 215. As another example, the column amplifiers 225 may include an ADC for converting analog signals to digital signals (e.g., to obtain digital count values). These digital signals may be provided to the column multiplexer 215.

Each unit cell may receive a bias signal (e.g., bias voltage, bias current) to bias the detector of the unit cell to compensate for different response characteristics of the unit cell attributable to, for example, variations in temperature, manufacturing variances, and/or other factors. For example, the control bias and timing circuitry 235 may generate the bias signals and provide them to the unit cells. By providing appropriate bias signals to each unit cell, the unit cell array 205 may be effectively calibrated to provide accurate image data in response to light (e.g., visible-light, IR light) incident on the detectors of the unit cells. In an aspect, the control bias and timing circuitry 235 may be, may include, or may be a part of, a logic circuit.

The control bias and timing circuitry 235 may generate control signals for addressing the unit cell array 205 to allow access to and readout of image data from an addressed portion of the unit cell array 205. The unit cell array 205 may be addressed to access and readout image data from the unit cell array 205 row by row, although in other implementations the unit cell array 205 may be addressed column by column or via other manners.

The control bias and timing circuitry 235 may generate bias values and timing control voltages. In some cases, the DAC 240 may convert the bias values received as, or as part of, data input signal on a data input signal line 255 into bias signals (e.g., analog signals on analog signal line(s) 260) that may be provided to individual unit cells through the operation of the column multiplexer 210, column amplifiers 220, and row multiplexer 230. For example, the DAC 240 may drive digital control signals (e.g., provided as bits) to appropriate analog signal levels for the unit cells. In some technologies, a digital control signal of 0 or 1 may be driven to an appropriate logic low voltage level or an appropriate logic high voltage level, respectively. In another aspect, the control bias and timing circuitry 235 may generate the bias signals (e.g., analog signals) and provide the bias signals to the unit cells without utilizing the DAC 240. In this regard, some implementations do not include the DAC 240, data input signal line 255, and/or analog signal line(s) 260. In an embodiment, the control bias and timing circuitry 235 may be, may include, may be a part of, or may otherwise be coupled to the processing component 110 and/or image capture component 120 of FIG. 1.

In an embodiment, the image sensor assembly 200 may be implemented as part of an imaging device (e.g., the imaging device 105). In addition to the various components of the image sensor assembly 200, the imaging device may also include one or more processors, memories, logic, displays, interfaces, optics (e.g., lenses, mirrors, beamsplitters), and/or other components as may be appropriate in various implementations. In an aspect, the data output signal on the data output line 250 may be provided to the processors (not shown) for further processing. For example, the data output signal may be an image formed of the pixel values from the unit cells of the image sensor assembly 200. The processors may perform operations such as non-uniformity correction (e.g., flat-field correction or other calibration technique), spatial and/or temporal filtering, and/or other operations. The images (e.g., processed images) may be stored in memory (e.g., external to or local to the imaging system) and/or displayed on a display device (e.g., external to and/or integrated with the imaging system). The various components of FIG. 2 may be implemented on a single chip or multiple chips. Furthermore, while the various components are illustrated as a set of individual blocks, various of the blocks may be merged together or various blocks shown in FIG. 2 may be separated into separate blocks.

It is noted that in FIG. 2 the unit cell array 205 is depicted as an 8×8 (e.g., 8 rows and 8 columns of unit cells. However, the unit cell array 205 may be of other array sizes. By way of non-limiting examples, the unit cell array 205 may include 512×512 (e.g., 512 rows and 512 columns of unit cells), 1024×1024, 2048×2048, 4096×4096, 8192×8192, and/or other array sizes. In some cases, the array size may have a row size (e.g., number of detectors in a row) different from a column size (e.g., number of detectors in a column). Examples of frame rates may include 30 Hz, 60 Hz, and 120 Hz. In an aspect, each unit cell of the unit cell array 205 may represent a pixel.

Infrared imaging systems (e.g., thermal cameras) may be used to capture infrared image data associated with a scene using an image sensor device (e.g., an FPA). A spatial gradient in an infrared imaging system may be determined (e.g., estimated) by measuring temporal gradients (e.g., rate of change of temperature). An infrared imaging system that is heated up from the outside (e.g., when the infrared imaging system is taken from cold air outside to room temperature air inside) may exhibit a spatial thermal gradient that is correlated (e.g., strongly correlated) to a rate of change of temperature. In this case, a change in ambient temperature may change a temperature of the image sensor device of the infrared imaging system relative to a temperature of another component, such as a housing, of the infrared imaging system.

During a startup of (e.g., an initial power on of) the infrared imaging system or other internal heating process, the infrared imaging system is heated up internally. The spatial thermal gradients may then be different for the same measured rate of change. As one example, the startup may end after around five minutes (e.g., steady state begins after around five minutes after startup is initiated). After the startup ends, temperatures and rates of change of temperature associated with various components of the infrared imaging system are primarily caused by external factors rather than internal heating of the infrared imaging system. The compensation may adapt between startup behavior and steady state behavior in which temperature changes are primarily caused by external factors. In an aspect, the compensation may be represented using models (e.g., thermal models) that characterize a temperature associated with one or more components of the infrared imaging system. In some cases, such models may account for thermal gradients generated by varying external temperatures. Temperature data from one or more thermal sensors may be used as input to the models.

Using various embodiments, the infrared imaging system may perform compensation to provide temperature measurements of higher accuracy (e.g., higher radiometric accuracy) relative to a case in which compensation is not performed, even during the startup mode in which the infrared imaging systems exhibit significant internal heating (e.g., due to powering on of various components of the infrared imaging systems). The compensation may be based on temperature data from one or more temperature sensors. In some cases, each temperature sensor may be within a housing the infrared imaging system. Each temperature sensor may be used to measure a temperature of a component of the infrared imaging system. A thermal gradient (e.g., a rate of change of the temperature) associated with the component may be determined based on measurements, at different points in time, of the temperature of the component by the temperature sensor. In some aspects, the compensation may account for internal radiation on the image sensor device of the infrared imaging system, where such internal radiation on the image sensor device may affect temperatures (e.g., of objects and/or other features/aspects of the scene) determined by the infrared imaging system. In some aspects, the compensation may allow gradients caused by external temperature changes to be accounted differently from internal variations at startup. As one example, the infrared imaging system may need to compensate for out-of-field radiation to provide accurate radiometric information.

Figure 3:
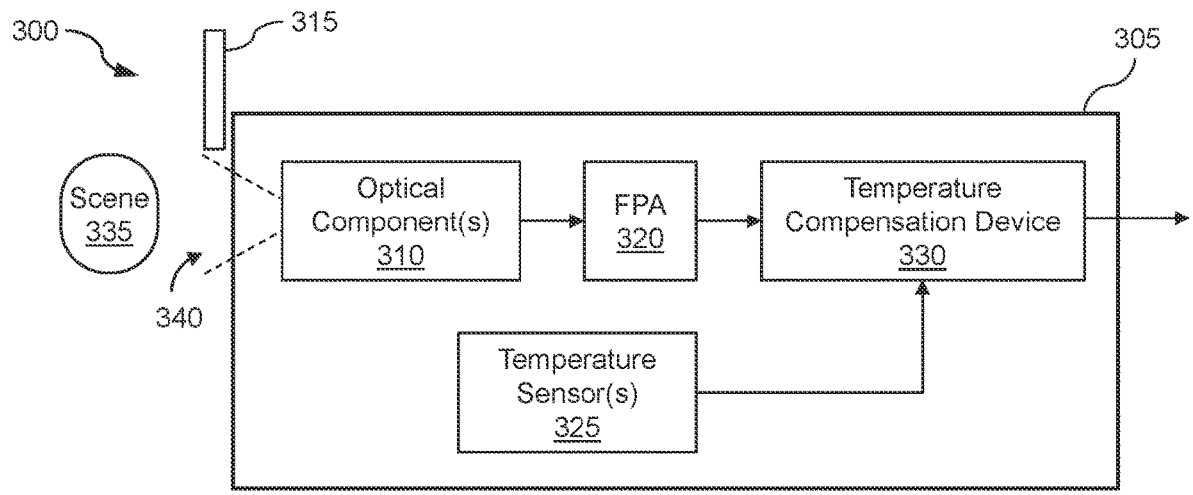
FIG. 3 illustrates an example system for facilitating temperature compensation in accordance with one or more embodiments of the present disclosure.

FIG. 3 illustrates an example system 300 for facilitating temperature compensation in accordance with one or more embodiments of the present disclosure. The system 300 may be, or may be a part of, an infrared imaging system used to capture and process images. In an embodiment, the infrared imaging system may be, may include, or may be a part of, the imaging system 100 of FIG. 1. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The system 300 includes a housing 305 (e.g., a camera body), one or more optical components 310, a shutter 315, an FPA 320, one or more temperature sensors 325, and a temperature compensation device 330. In an embodiment, the optical component(s) 310, the shutter 315, the FPA 320, the temperature sensor(s) 325, and/or the temperature compensation device 330 may be implemented using one or more processing circuits on a single chip or distributed across two or more chips.

The housing 305 may house the optical component(s) 310, the shutter 315, the FPA 320, the temperature sensor(s) 325, and/or the temperature compensation device 330. Although the optical component(s) 310, the FPA 320, the temperature sensor(s) 325, and the temperature compensation device 330 are disposed within the housing 305 in FIG. 3, fewer, more, and/or different components may be disposed within the housing 305. In an aspect, the housing 305 may house at least the optical component(s) 310, the FPA 320, and the temperature sensor(s) 325. The shutter 315 and/or the temperature compensation device 330 may be disposed within the housing 305 or external to the housing 305.

The optical component(s) 310 may receive electromagnetic radiation from a scene 335 through an aperture 340 of the system 300 and pass the electromagnetic radiation to the FPA 320. For example, the optical component(s) 310 may direct and/or focus electromagnetic radiation on the FPA 320. The optical component(s) 310 may include one or more windows, lenses, mirrors, beamsplitters, beam couplers, and/or other components. The optical component(s) 310 may include components each formed of material and appropriately arranged according to desired transmission characteristics, such as desired transmission wavelengths and/or ray transfer matrix characteristics.

The shutter 315 may be operated to selectively expose or block the aperture 340. When the shutter 315 is positioned to expose the aperture 340, the electromagnetic radiation from the scene 335 may be received and directed by the optical component(s) 310. When the shutter 315 is positioned to block the aperture 340, the electromagnetic radiation from the scene 335 is blocked from the optical component(s) 310. In some cases, the shutter 315 may block the aperture 340 during a calibration process, in which the shutter 315 may be used as a uniform blackbody.

The FPA 320 includes a detector array and an ROIC. The FPA 320 may receive the electromagnetic radiation from the optical component(s) 310 and generate image data based on the electromagnetic radiation (e.g., infrared component of the electromagnetic radiation). The image data may include infrared data values (e.g., thermal infrared data values). As an example, the FPA 320 may include or may be coupled to an ADC circuit that generates infrared data values based on infrared radiation. A 16-bit ADC circuit may generate infrared data values that range from 0 to 65,535. The infrared data values may provide temperatures for different portions of the scene, such as provide temperatures of objects, persons, and/or other aspects in the scene 335. In some cases, the infrared image data may be represented in an image according to a palette, such that a visual representation value (e.g., color value or grayscale value) of each pixel of the image is indicative of a temperature associated with that pixel. For example, a temperature associated with an object in the scene 335 may be represented in pixels (e.g., a subset of pixels) of an infrared image (e.g., a thermal infrared image) that correspond to the object. The infrared image data may be displayed (e.g., to a user), stored, and/or processed. In an aspect, the detector array is an infrared detector array (e.g., microbolometer array) that detects IR radiation (e.g., thermal IR radiation). In an embodiment, the FPA 320 may be implemented by the imaging capture component 120.

During operation of the FPA 320 to receive the electromagnetic radiation from the scene 335, the FPA 320 may also capture radiation (e.g., internal radiation) from one or more elements/components of the infrared imaging system. Such radiation may be considered non-scene-related radiation/undesired radiation that is generated by the element(s)/component(s) of the infrared imaging system and captured by the FPA 320 during operation of the FPA 320 to capture scene information. Temperature compensation may be performed to compensate for such non-scene-related radiation, as further described herein, since the infrared data values generated by the FPA 320 are based in part on the non-scene-related radiation.

The temperature sensor(s) 325 may measure a temperature of the housing 305, the optical component(s) 310, the shutter 315, the FPA 320, and/or other components (not shown in FIG. 3) of the system 300. Each temperature sensor may be a thermistor, thermocouple, and/or other thermal sensor for measuring temperature. As one example, the infrared imaging system may be a small camera module that includes a single temperature sensor used to measure a temperature of the FPA 320. As another example, the infrared imaging system may include a temperature sensor to measure the temperature of the FPA 320 and a temperature sensor to measure a temperature of a lens (that forms at least a part of the optical component(s) 310). In an embodiment, the temperature sensor(s) 325 may be implemented by or as part of the sensing component 140.

The temperature compensation device 330 may receive the image data (e.g., the infrared data values) generated by the FPA 320 and the temperature data from the temperature sensor(s) 325. The temperature compensation device 330 may perform temperature compensation on the image data to account for (e.g., mitigate) any radiation (e.g., out-of-field radiation, internal radiation, etc.) that the FPA 320 may receive that may decrease radiometric accuracy of the image data generated by the FPA 320. In an embodiment, the compensation may adapt between compensation while the infrared imaging system exhibits startup behavior (e.g., is in the startup mode) and compensation while the infrared imaging system exhibits steady state behavior (e.g., is in the steady state mode).

In an aspect, the temperature compensation device 330 may provide, as output, temperature measurements/values of one or more objects/persons/features in the scene. For example, the temperature measurements/values may be provided using numerical values. In some cases, alternatively or in addition, the temperature compensation device 330 may represent such temperature measurements/values in an image, in which a temperature value associated with each pixel of the image represented using a color value or a grayscale value according to a palette. An image generated by the temperature compensation device 330 by performing temperature compensation of the image data from the FPA 320 may be referred to as a temperature compensated image. More generally, an output generated by the temperature compensation device 330 by performing temperature compensation of the image data from the FPA 320 may be referred to as temperature compensated image data or a temperature compensated output. Outputs of the temperature compensation device 330 may be provided for further processing (e.g., noise-reducing processing, fusing with images of the same or other wavebands, etc.), storage, and/or display.

In an embodiment, the FPA 320 and the temperature compensation device 330 may be collectively implemented by the imaging capture component 120, in which an output of the temperature compensation device 330 is referred to as temperature compensated image data. In some cases, the temperature compensated image data may indicate temperatures of objects in the scene 335 determined in part using temperature compensation. In some cases, the temperature compensated image data may be represented in a temperature compensated image. In another embodiment, the FPA 320 may be implemented by the imaging capture component 120 and the temperature compensation device 330 may be implemented by the processing component 110. In such an embodiment, image data from the imaging capture component 120 may be provided to the processing component 110 (e.g., via the image interface 125) and temperature compensation performed on the image data by the processing component 110 to obtain temperature compensated image data. In some cases, a user of the infrared imaging system may be able to access the image data generated by the FPA 320 (e.g., prior to compensation) and the temperature compensated image data. In other cases, the user of the infrared imaging system may be able to access only the temperature compensated image data.

In one or more embodiments, temperature compensation performed by the temperature compensation device 330 may be based on a temperature of one or more components of the infrared imaging system that radiate on the FPA 320. Since the component(s) radiates onto the FPA 320, the temperature of the component(s) may affect image data captured by the FPA 320. In some aspects, such components are within the housing 305 of the infrared imaging system.

As such, a temperature of such components provides an internal temperature of the infrared imaging system.

For some of these components, a temperature of the components may be measured directly using one or more of the temperature sensor(s) 325. As non-limiting examples, a temperature sensor may be disposed on the FPA 320, the housing 305, and/or a lens (e.g., part of the optical component(s) 310) that directs light to the FPA 320. Other components may not have a temperature sensor for measuring their temperatures. A temperature of one or more of these other components may be determined (e.g., estimated, modeled) based in part on temperature data (e.g., temperature measurements) from the temperature sensor(s) 325. As non-limiting examples, these components may include the housing 305 (e.g., when the housing 305 does not have a temperature sensor measuring its temperature), the lens that directs light to the FPA 320, and/or the shutter 315. In some cases, a temperature sensor(s) may not be disposed on each component itself due to spatial considerations (e.g., limited space around the component and/or within the housing, disposing of a temperature sensor on the component may block an optical path to the FPA 320, etc.), power considerations (e.g., each disposed temperature sensor requires power to operate), and/or other considerations. As such, using various embodiments, the temperature compensation performed by the temperature compensation device 330 may be based on temperature data (e.g., temperature measurements) of one or more components from the temperature sensor(s) 325 and a temperature of one or more other components determined (e.g., through appropriate modeling) based on the temperature data from the temperature sensor(s) 325.

As one non-limiting example, a general model for describing spatially varying internal temperatures of the infrared imaging system as a function of temperature data from the temperature sensor(s) 325 and temporal changes in the temperature data (e.g., rate of change of the temperature measurements) can be provided by $$T_i = \sum_{j=0}^{N-1} [A_{ij} TS_j] + B_i + \sum_{j=0}^{N-1} \left[ C_{ij} \frac{dTS_j}{dt} \right] \qquad \text{Equation (1)}$$

where $T_i$ is a temperature of the $i^{th}$ component of the infrared imaging system, $N \geq 1$ is the number of temperature sensors, $A_{ij}$ and $B_i$ are model parameter for determining $T_i$ as a function of temperature measurements $TS_j$ from each of the N temperature sensor(s) where $j=0, \ldots, N-1$, and $C_{ij}$ is a model parameter to determine a dependency of the temperature $T_i$ of the $i^{th}$ component of the infrared imaging system on the rate of change of the temperature measurements $dTS_j/dt$ provided by each of the N temperature sensor(s). In this regard, the temperature $T_i$ of the $i^{th}$ component of the infrared imaging system is dependent on temperatures and rates of change of temperatures of components of the infrared imaging system whose temperatures are measured by the temperature sensor(s) 325. Other environment conditions aside from ambient temperature, such as humidity, may affect radiation. In some aspects, a model may take into consideration humidity levels and/or other atmospheric/environment measurements, which may affect internal radiation.

As one example, the infrared imaging system may be a small camera module that includes a single temperature sensor that is used to measure a temperature of the FPA 320. A temperature of one or more other components (e.g., the housing 305, the shutter 315, and/or the lens) may be determined based at least on temperature measurements of the FPA 320 by the single temperature sensor. In this regard, with reference to Equation (1), the temperature measurements $TS_j$ are from the single temperature sensor and the rate of change $dTS_j/dt$ may be derived from the temperature measurements, and the components whose temperature $T_i$ is determined/modeled may include the housing 305, the shutter 315, and/or the lens.

As another example, the infrared imaging system may include a temperature sensor to measure the temperature of the FPA 320 and a temperature sensor to measure the temperature of the lens. A temperature of other components (e.g., the housing 305 and/or the shutter 315) may be determined based at least on temperature measurements of the FPA 320 and the lens. In this example, with reference to Equation (1), the temperature measurements $TS_j$ are from the two temperature sensor and the rate of change $dTS_j/dt$ derived from the temperature measurements, and the components whose temperature $T_i$ is determined/modeled may include the housing 305 and/or the shutter 315. In some cases, such as when the housing 305 and the shutter 315 are close to each other and/or are implemented using the same or similar material, the temperature $T_i$ for the housing 305 and the shutter 315 may be assumed to be the same. It is noted that in some cases the temperature of the shutter 315 (e.g., whether it be measured using a temperature sensor or modeled) may be used as part of a calibration process.

In an aspect, the parameters $A_{ij}$ and $B_i$ are constant parameters (e.g., remain constant over time) and the parameter $C_{ij}$ may be a time-dependent parameter. In this regard, at startup or other internal heating processes, the parameter $C_{ij}$ may change continuously from startup behavior to steady state behavior. As an example, other than startup, an internal heating process may result from a change in operating mode of the infrared imaging system, such as a changing of a frame rate associated with the FPA 320 which may cause a change in internal heating. As another example, an internal heating process may result from turning on/off or otherwise changing power dissipating electronics (e.g., image processor close to the FPA 320). As a non-limiting example, the parameter $C_{ij}$ may be provided by:

$$C_{ij}(t) = C_{init} + (C_{final} - C_{init}) \left[ 1 - \exp\left( -\frac{t}{t_0} \right)^{\alpha} \right] \qquad \text{Equation (2)}$$

where t=0 may be a start time of the startup or other internal heating process. In some cases, a parameter $\alpha$ may be determined empirically to allow for an appropriate transition between $C_{init}$ and $C_{final}$. As an example, the parameter $\alpha$ chosen to be two for a smooth transition between $C_{init}$ and $C_{final}$. A parameter $t_0$ provides a characteristic time constant associated with going from startup to steady state. A ratio between $C_{final}$ and $C_{init}$ may characterize a difference between startup heating and heating/cooling due to external causes (e.g., changes in ambient temperature). As one example, the ratio between $C_{final}$ and $C_{init}$ may be five or more depending on the infrared imaging system that is modeled, thus showing an importance in distinguishing distinguish between startup heating and heating/cooling from the outside in order to compensate accurately.

As another non-limiting example, the parameter $C_{ij}$ may be provided by:

$$C_{ij}(t) = \begin{cases} C_{init} & \text{for } t < t_0 \\ C_{final} & \text{for } t \geq t_0 \end{cases} \qquad \text{Equation (3)}$$

where t=0 may be a start time of the startup or other internal heating process. In this regard, the parameter $C_{ij}$ is a piecewise function, with the parameter $t_0$ providing the characteristic time constant associated with transitioning from startup to steady state.

As another non-limiting example, the parameter $C_{ij}$ may be provided by:

$$C_{ij}(t) = \frac{C_{init} + C_{final}}{2} + \frac{C_{final} - C_{init}}{\pi} \tan^{-1}\left( \frac{t - t_0}{\tau} \right) \qquad \text{Equation (4)}$$

where t=0 may be a start time of the startup or other internal heating process, the parameter $t_0$ may provide the characteristic time constant associated with transitioning from startup to steady state, and a parameter $\tau$ may determine a time scale for the transition. In Equation (4), $C_{ij}(t) \approx C_{init}$ for lower values of t and $C_{ij}(t) \approx C_{final}$ for higher values of t.

As provided above, many different models may be used to describe the parameter $C_{ij}$. Time dependence provided in Equations (1) through (4) allow for adaptive models (e.g., with Equations (1), (2), and (4) being continuously adapting models) that differentiate and transition between startup behavior and steady state behavior. An amount of time that the infrared imaging system spends operating in the startup mode and the steady state mode may be based in part on architecture/components that form the infrared imaging system. In some cases, the amount of time may be further based on an ambient temperature when the infrared imaging system is turned on. As one example, the infrared imaging system may primarily exhibit startup behavior for around four minutes to six minutes after turning on the infrared imaging system.

The parameters $A_{ij}$, $B_i$, and $C_{ij}$ (including $C_{init}$, $C_{final}$, $t_0$, and $\tau$ dependent on model) may be determined during manufacturing processes and/or calibration processes of the infrared imaging system or portion thereof. In some cases, the parameters $A_{ij}$, $B_i$, and/or $C_{ij}$ may be manufacturing parameters associated with an individual camera or a line of cameras. As one example, calibration of the infrared imaging system may be based on using the infrared imaging system to capture images of objects having known temperatures and/or with components of the infrared imaging system maintained at known temperatures. During steady state operation (e.g., after a startup process or other internal heating process), the parameter $C_{ij}$ may be considered a constant parameter (e.g., for Equation (2), the term $\exp(-t/t_0)^\alpha=0$ for large t and thus $C_{ij}(t) \approx C_{final}$ for large t) along with the constant parameters $A_{ij}$ and $B_i$, and thus the model provided by Equation (1) may be accurate with constant parameters $A_{ij}$, $B_i$, and $C_{ij}$.

In one non-limiting example, the parameters $A_{ij}$, $B_i$, and $C_{final}$ may be determined during steady state operation. To reach steady state operation, the infrared imaging system may be turned on and left on such that the infrared imaging system is exhibiting steady state behavior in which temperature changes of the infrared imaging system are primarily caused by external factors. At this time, $C_{ij}(t) \approx C_{final}$. External temperatures, such as ambient temperature and/or a temperature of an object in a scene, may be known and/or controlled to facilitate determination of the parameters $A_{ij}$, $B_i$, and $C_{final}$. After the parameters $A_{ij}$, $B_i$, and $C_{final}$ are determined, the infrared imaging system may be turned on and its startup process investigated to determine $C_{init}$. Other manners by which to determine the parameters $A_{ij}$, $B_i$, and/or $C_{ij}$ may be used. For example, in some cases, the parameters $A_{ij}$ and/or $B_i$ may be determined, at least in part, during startup.

Although in the foregoing the parameters $A_{ij}$ and $B_i$ are constant over time and the parameter $C_{ij}$ is time-dependent, in some cases the parameters $A_{ij}$ and/or $B_i$ may be time-dependent. Furthermore, although the model provided in Equation (1) provides three terms each associated with one of parameters $A_{ij}$, $B_i$, or $C_{ij}$, other models may involve fewer than or more than three terms and/or involve one or more terms that are associated with multiple parameters. In some cases, the parameters may have different values depending on initial conditions associated with the infrared imaging system. As an example, the infrared imaging system may operate longer in the startup mode if it is turned on in a cold ambient temperature relative to being turned on in a warmer ambient temperature. The infrared imaging system may be calibrated using different initial conditions and parameters such as the parameter $t_0$ may have different values dependent on the initial conditions. For example, during startup, the infrared imaging system may determine initial conditions and select the parameter $t_0$ (determined during calibration) associated with initial conditions closest to the initial conditions determined by the infrared imaging system. In other cases, the models may be defined such that the parameters are independent of the initial conditions.

Performance of temperature compensation through modeling that accounts for startup behavior and steady state behavior, such as by using the models provided by Equations (1) and (2), allows the infrared imaging system to provide high radiometric accuracy (e.g., temperature determinations) even during startup. In this regard, the user of the infrared imaging system may avoid having to wait until the startup behavior has ended (e.g., which may take five minutes or longer depending on the infrared imaging system) to obtain accurate radiometry from the infrared imaging system.

Figure 4:
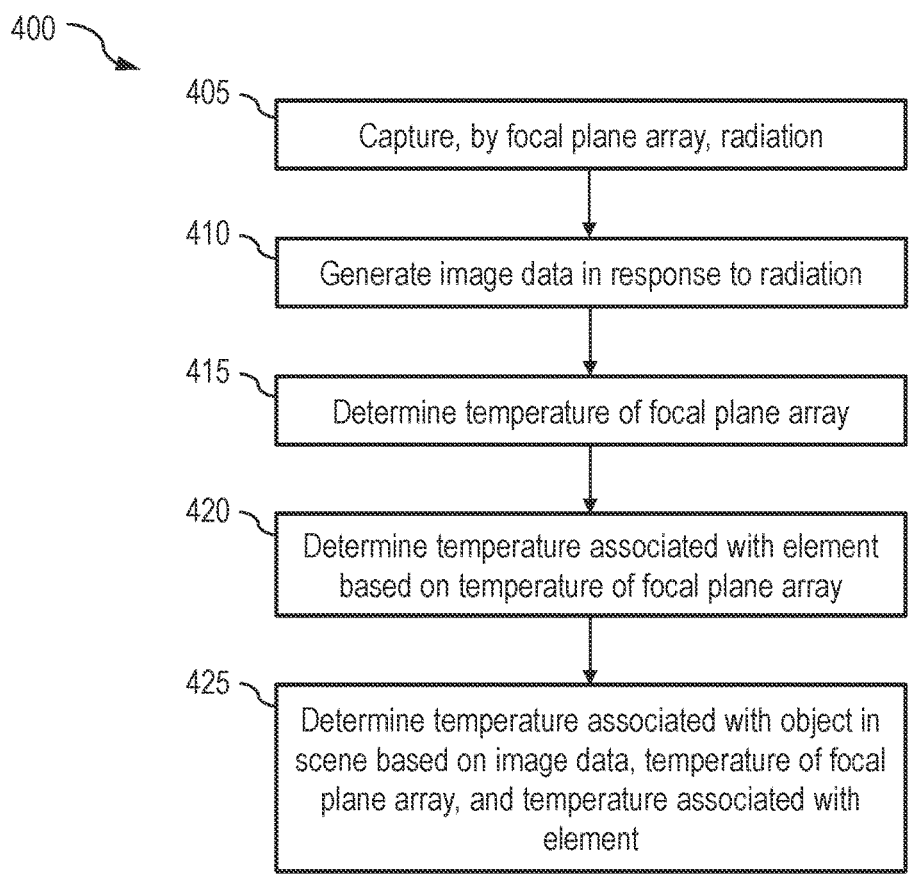
FIG. 4 illustrates a flow diagram of an example process for facilitating temperature compensation in accordance with one or more embodiments of the present disclosure.

FIG. 4 illustrates a flow diagram of an example process 400 for facilitating temperature compensation in accordance with one or more embodiments of the present disclosure. Although the process 400 is primarily described herein with reference to the system 300 of FIG. 3 for explanatory purposes, the process 400 can be performed in relation to other systems for facilitating temperature compensation. Note that one or more operations in FIG. 4 may be combined, omitted, and/or performed in a different order as desired.

At block 405, the FPA 320 captures radiation (e.g., infrared radiation). The radiation may include radiation from the scene 335 as well as radiation from one or more elements of the infrared imaging system. The radiation from the element(s) may be considered non-scene-related radiation/ undesired radiation captured by the FPA 320 during operation of the FPA 320 to capture scene information. Temperature compensation may be performed to compensate for such non-scene-related radiation, since the infrared data values generated by the FPA 320 are based in part on the non-scene-related radiation. By way of non-limiting examples, an element may include the housing 305, the shutter 315, or a lens element (e.g., part of the optical component(s) 310). In some cases, to reach the FPA 320, the radiation (e.g., from the scene 335) may propagate through an optical path of the infrared imaging system formed of one or more of the optical component(s) 310.

At block 410, the FPA 320 generates image data (e.g., infrared image data) in response to the radiation. In some cases, the FPA 320 and/or circuitry coupled to the FPA 320 may convert the radiation into electrical signals (e.g., voltages, currents, etc.) and generate the image data based on the electrical signals. The image data may include pixel values. The pixel values may be represented in terms of digital count values generated based on the electrical signals obtained from converting the captured radiation. For example, in a case that the FPA 320 includes or is otherwise coupled to an ADC circuit, the ADC circuit may generate digital count values based on the electrical signals. For an ADC circuit that can represent an electrical signal using 14 bits, the digital count value may range from 0 to 16,383. In some cases, the FPA 320 may represent the image data in an image according to a palette. A given pixel of the image may have a visual representation value (e.g., a color value or a grayscale value) indicative of a temperature of the pixel. For example, a temperature associated with an object in the scene 335 may be represented in pixels of an infrared image (e.g., a thermal infrared image) formed of the image data that correspond to the object. This temperature associated with the object may be referred to as an uncompensated temperature.

At block 415, the temperature sensor(s) 325 determines a temperature of the FPA 320. In some cases, the temperature sensor(s) 325 may determine a temperature of other components of the infrared imaging system, such as the housing 305 and/or the shutter 315. As one example, the temperature sensor(s) 325 may include only the temperature sensor disposed on and used to measure a temperature of the FPA 320. As another example, the temperature sensor(s) 325 may include at least a temperature sensor disposed on and used to measure a temperature of the FPA 320 and a temperature sensor disposed on and used to measure a temperature of the shutter 315.

At block 420, the temperature compensation device 330 determines a temperature associated with the element(s) of the infrared imaging system that radiate onto the FPA 320 based on temperature data from the temperature sensor(s) 325. In some cases, for a given element, the temperature associated with the element may be based on the temperature of the FPA 320 and a rate of change of the temperature of the FPA 320. In some cases, the temperature data may include a temperature and a rate of change of the temperature of other components (e.g., as measured by the temperature sensor(s)) of the infrared imaging system aside from the FPA 320.

In an embodiment, the compensation may adapt between compensation while the infrared imaging system exhibits startup behavior (e.g., is in the startup mode) and compensation while the infrared imaging system exhibits steady state behavior (e.g., is in the steady state mode). In an aspect, to adapt between compensation in the startup mode and compensation in the steady state mode, a temperature associated with an element may be modeled according to Equation (1). It is noted that whether a temperature of an element of the infrared imaging system is modeled for purposes of temperature compensation may be based on a relative contribution of a radiation of the element onto the FPA 320. If an element is determined (e.g., through simulation, modeling, or other manner) to have a negligible effect on the radiation captured by the FPA 320, the element may be ignored for purposes of temperature compensation. Whether or not an element is considered to have a negligible effect is generally dependent on application (e.g., radiometric accuracy requirements, power requirements), computational resources, and so forth.

At block 425, the temperature compensation device 330 determines a temperature associated with an object in in the scene 335 based on the image data, the temperature associated with the element(s), and the temperature of the FPA 320. This temperature associated with the object may be referred to as a compensated temperature. In this regard, the temperature associated with the object may be referred to as a temperature compensation output of the temperature compensation device 330. The temperature compensation performed by the temperature compensation device 330 may be to compensate for the radiation from one or more elements of the infrared imaging system captured at block 405. In some cases, the radiation from the scene 335 may be considered useful or target image data whereas the radiation from the element(s) may be considered noise or undesired image data. The temperature associated with the object may be further based on a rate of change of the temperature of the FPA 320. In some cases, the temperature associated with the object may be based on a temperature and a rate of change of the temperature of other components of the infrared imaging system. In an aspect, the temperature compensation device 330 may generate temperature compensated image data. In some cases, the temperature compensated image data may be represented in an image, which may be referred to as a temperature compensated image.

Although the foregoing describes compensation of infrared image data in real-time or near real-time with capture of the infrared image data, the infrared image data may be stored (e.g., in the memory component 115) for retrieval and compensation at a later time. In some cases, the infrared image data may be associated with a timestamp indicating a time at which the infrared image data is captured and stored. Temperature data captured at or around the time indicated by the timestamp may also be stored. With the infrared image data and corresponding temperature data, compensation may be performed on the infrared image data at a later time. In some cases, compensation may be performed at a later time alternative to or in addition to compensation performed at around the time the infrared image data was captured. As an example, a thermal model, such as provided by Equations (1) and (2), may be refined (e.g., $A_{ij}$, $B_i$, and/or $C_{ij}$ determined with higher accuracy) such that compensation at the later time may be associated with higher radiometric accuracy than compensation using the thermal model prior to refinement.

Where applicable, various embodiments provided by the present disclosure can be implemented using hardware, software, or combinations of hardware and software. Also where applicable, the various hardware components and/or software components set forth herein can be combined into composite components comprising software, hardware, and/ or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into substeps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. An infrared imaging system comprising:
    a focal plane array (FPA) configured to capture radiation from a scene and generate infrared image data based on the radiation, wherein the FPA further captures radiation from an element associated with the infrared imaging system during capture of the radiation from the scene;
    a first temperature sensor configured to determine a temperature of the FPA; and
    a processing circuit configured to:
        determine a temperature associated with the element based at least in part on a multiplication of the temperature of the FPA with a first parameter and a multiplication of a rate of change of the temperature of the FPA with a second parameter; and
        determine a temperature associated with an object in the scene based on the infrared image data, the temperature associated with the element, and the temperature of the FPA.

2. The infrared imaging system of claim 1, wherein the element comprises a housing, wherein the FPA and the first temperature sensor are disposed within the housing, and wherein the temperature associated with the element is further based on whether the infrared imaging system is operating in a startup condition or a steady state condition.

3. The infrared imaging system of claim 1, wherein the element comprises a housing, a shutter, or a lens, wherein the infrared image data is indicative of a temperature estimate associated with the object, and wherein the processing circuit is configured to determine the temperature associated with the object by compensating for the radiation from the element based at least in part on the temperature of the FPA to obtain the temperature of the object.

4. The infrared imaging system of claim 1, wherein at least the second parameter is a time-dependent parameter.

5. The infrared imaging system of claim 1, further comprising a housing, wherein:
the element comprises a shutter;
the processing circuit is further configured to determine a temperature associated with the housing based in part on the temperature of the FPA; and
the processing circuit is configured to determine the temperature associated with the object further based on the temperature associated with the housing.

6. The infrared imaging system of claim 1, further comprising a housing and a second temperature sensor configured to determine a temperature of the housing, wherein the element comprises a lens, and wherein the processing circuit is configured to determine the temperature associated with the lens based on the temperature of the housing and the temperature of the FPA.

7. An infrared imaging system comprising:
a housing;
a focal plane array (FPA) configured to capture radiation from a scene and generate infrared image data based on the radiation, wherein the FPA further captures radiation from an element associated with the infrared imaging system during capture of the radiation from the scene, wherein the element comprises a lens;
a first temperature sensor configured to determine a temperature of the FPA;
a second temperature sensor configured to determine a temperature of the housing; and
a processing circuit configured to:
determine a temperature associated with the element based at least in part on the temperature of the FPA at least by determining a temperature associated with the lens based on the temperature of the housing, a rate of change of the temperature of the housing, the temperature of the FPA, and a rate of change of the temperature of the FPA; and
determine a temperature associated with an object in the scene based on the infrared image data, the temperature associated with the element, and the temperature of the FPA.

8. The infrared imaging system of claim 7, wherein the temperature associated with the lens is based on a multiplication of the temperature of the FPA with a first parameter, a multiplication of the rate of change of the temperature of the FPA with a second parameter, a multiplication of the temperature of the housing with a third parameter, and a multiplication of the rate of change of the temperature of the housing with a fourth parameter.

9. The infrared imaging system of claim 1, wherein the FPA comprises an array of microbolometers configured to capture the radiation from the scene, and wherein the array of microbolometers further captures the radiation from the element during capture of the radiation from the scene.

10. A method comprising:
capturing, by a focal plane array (FPA), radiation from an element and from a scene;
generating, by the FPA, infrared image data based on the radiation;
measuring a temperature of a housing using a temperature sensor, wherein the element, the FPA, and the temperature sensor are disposed within the housing;
determining a temperature of the FPA;
determining a temperature associated with the element based at least in part on the temperature of the FPA, the temperature of the housing, a rate of change of the temperature of the FPA, and a rate of change of the temperature of the housing; and
determining a temperature associated with an object in the scene based on the infrared image data, the temperature associated with the element, and the temperature of the FPA.

11. The method of claim 10, wherein the housing is a housing of an infrared imaging system, wherein the temperature associated with the element is further based on whether the infrared imaging system is operating in a startup condition or a steady state condition.

12. The method of claim 10, wherein the temperature associated with the element is based on the temperature of the housing, the rate of change of the temperature of the housing, a multiplication of the temperature of the FPA with a first parameter, and a multiplication of the rate of change of the temperature of the FPA with a second parameter.

13. The method of claim 12, wherein at least the second parameter is a time-dependent parameter.

14. The method of claim 10, wherein the temperature associated with the object is further based on the temperature associated with the housing.

15. The method of claim 10, wherein the temperature associated with the element is based on a multiplication of the temperature of the FPA with a first parameter, a multiplication of the rate of change of the temperature of the FPA with a second parameter, a multiplication of the temperature of the housing with a third parameter, and a multiplication of the rate of change of the temperature of the housing with a fourth parameter.

16. The method of claim 10, wherein the temperature associated with the element is further based on a parameter associated with the rate of change of the temperature of the FPA.

17. The method of claim 10, wherein the temperature associated with the element is further based on a parameter associated with the rate of change of the temperature of the housing.

18. The infrared imaging system of claim 7, wherein the temperature associated with the element is further based on whether the infrared imaging system is operating in a startup condition or a steady state condition.

19. The infrared imaging system of claim 7, wherein the FPA is further configured to capture the radiation from the element during capture of the radiation from the scene.

20. The infrared imaging system of claim 7, wherein the temperature associated with the lens is based on a multiplication of the rate of change of the temperature of the FPA with a parameter.

* * * * *

UNITED STATES PATENT AND TRADEMARK OFFICE
CERTIFICATE OF CORRECTION

PATENT NO.        : 12,207,016 B2
APPLICATION NO.   : 17/744497
DATED             : January 21, 2025
INVENTOR(S)       : Per O. Elmfors Page 1 of 1

It is certified that error appears in the above-identified patent and that said Letters Patent is hereby corrected as shown below:

In the Specification

Column 19, Line 18, change "each of the N temperature sensor(s)." to --each of the $N$ temperature sensor(s).--.

Column 20, Line 37, change "where t=0 may be a start time" to --where t = 0 may be a start time--.

Signed and Sealed this
Fourth Day of March, 2025

Coke Morgan Stewart
*Acting Director of the United States Patent and Trademark Office*